United States Patent
Lai

(10) Patent No.: US 6,546,956 B1
(45) Date of Patent: Apr. 15, 2003

(54) OPAQUE CONTAINER FLUID INDICATOR

(76) Inventor: Yuan-Song Lai, No. 32, Fuyi Rd., Taiping City, Taichung County (TW)

( * ) Notice: Subject to any disclaimer, the term of this patent is extended or adjusted under 35 U.S.C. 154(b) by 0 days.

(21) Appl. No.: 10/004,868

(22) Filed: Dec. 7, 2001

(51) Int. Cl.[7] .................................................. F16K 37/00
(52) U.S. Cl. ........................ 137/558; 137/559; 116/227
(58) Field of Search ............................... 137/558, 559; 116/227; 73/290 R

(56) References Cited

U.S. PATENT DOCUMENTS

| | | | | |
|---|---|---|---|---|
| 127,917 A | * | 6/1872 | Painter | 137/558 |
| 494,467 A | * | 3/1893 | Donathen | 137/558 |
| 598,985 A | * | 2/1898 | Fleming | 137/558 |
| 3,851,661 A | * | 12/1974 | Fernandez | 137/558 |

* cited by examiner

*Primary Examiner*—A. Michael Chambers
(74) *Attorney, Agent, or Firm*—Rosenberg, Klein & Lee

(57) ABSTRACT

An opaque container fluid indicator is constructed to include a mount fixedly fastened to the spout of an opaque fluid container, a bladder holder supported on the mount to hold an elastic transparent bladder, and two suction tubes respectively fastened to two bottom through holes of the bladder holder and suspended in the opaque fluid container to suck fluid into the bladder. Air passes through the suction tubes to force fluid out of the bladder when the level of fluid in the opaque fluid container drops below a predetermined low level.

4 Claims, 5 Drawing Sheets

OPAQUE CONTAINER FLUID INDICATOR

BACKGROUND OF THE INVENTION

1. Field of the Invention

The present invention relates to an opaque container fluid indicator and, more particularly, to a simple structure of opaque container fluid indicator that is inexpensive to manufacture and, that accurately indicates the presence/non-presence condition of fluid in the opaque container.

2. Description of the Related Art

When using an opaque fluid container to hold a fluid, for example, an oil tank to hold hydraulic fluid or greasing oil, or a water tank to hold cooling water, a fluid indicator may be used to indicate the presence of fluid. There are known two fluid indicators for this purpose. According to the design shown in FIG. 1A, an opening is made on the peripheral wall of the opaque fluid container 1, and a panel 2 is fixedly fastened to the opening of the opaque fluid container 1. The panel 2 has a transparent view window 3 through which the level of fluid W in the opaque fluid container 1 is viewed. This design has numerous drawbacks including (1) making an opening on the peripheral wall of the opaque fluid container 1 obstructs the unity and structural strength of the opaque fluid container 1; (2) installation of the panel 2 in the opening of the peripheral wall of the opaque fluid container 1 is complicated; (3) an accidental impact of the opaque fluid container 1 may damage the connection between the peripheral wall of the opaque fluid container 1 and the panel 2, thereby causing a leakage. According to the design shown in FIG. 1B, a track 5 is installed in the opaque fluid container 4, an extension tube 6 is upwardly extended from the track 5, a float 7 is floating in fluid W and moved along the track 5, and a buoy 8 supported on the float 7 and moved with the float 7 up and down in the extension tube 6 subject to the level of fluid W in the opaque fluid container 4. This design is still not satisfactory in function because of the following drawbacks: (1) this design of fluid indicator is expensive to manufacture because it comprises too many parts; (2) the extension tube 6 tends to be damaged because it protrudes over the top side of the opaque fluid container 4 at a certain distance; (3) the float 7 tends to be jammed in the track 5 due to accumulation of oil dust, resulting in an error indication; and (4).

SUMMARY OF THE INVENTION

The present invention has been accomplished to provide an opaque container fluid indicator, which eliminates the aforesaid drawbacks. It is one object of the present invention to provide an opaque container fluid indictor, which is inexpensive to manufacture. It is another object of the present invention to provide an opaque container fluid indicator, which is easy to install. It is still another object of the present invention to provide an opaque container fluid indicator, which fits any of a variety of opaque fluid containers without making any structural change of the opaque fluid container. To achieve these and other objects of the present invention, the opaque container fluid indictor comprises a mount fixedly fastened to the spout of the opaque fluid container, a transparent hand pump supported on the mount, and two suction tubes downwardly extended from the hand pump and suspended in the opaque fluid container. The hand pump is formed of an elastic transparent bladder and a bladder holder. After installation in the spout of the opaque fluid container, the hand pump is operated to suck in fluid from the opaque fluid container. When the fluid level dropped below the critical elevation, air passes to the inside of the hand pump to force fluid out of the hand pump. Therefore, the hand pump is filled up with fluid when the fluid level is high; the hand pump is empty when the fluid level is low.

DETAILED DESCRIPTION OF THE PREFERRED EMBODIMENT

Figure 1A:
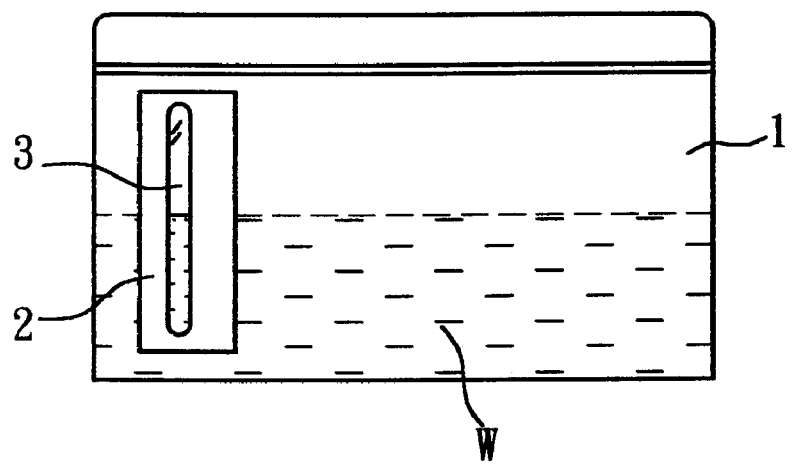
FIG. 1A shows an opaque container fluid indicator constructed according to the prior art.
Figure 1B:
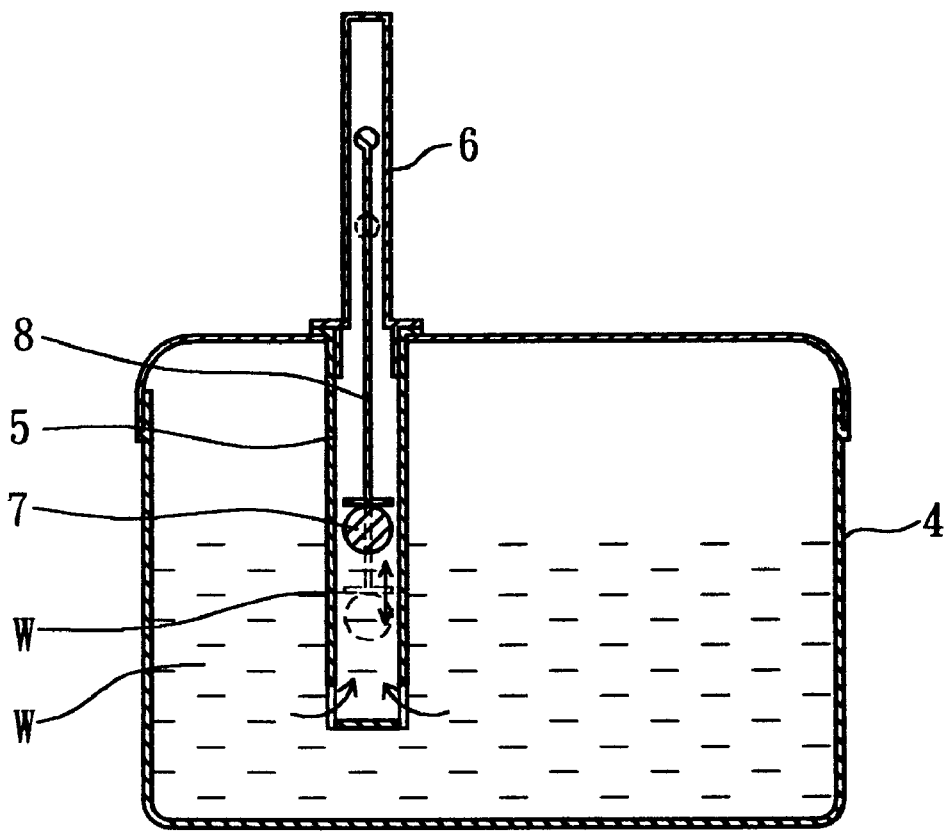
FIG. 1B shows another design of opaque container fluid indicator constructed according to the prior art.
Figure 2:
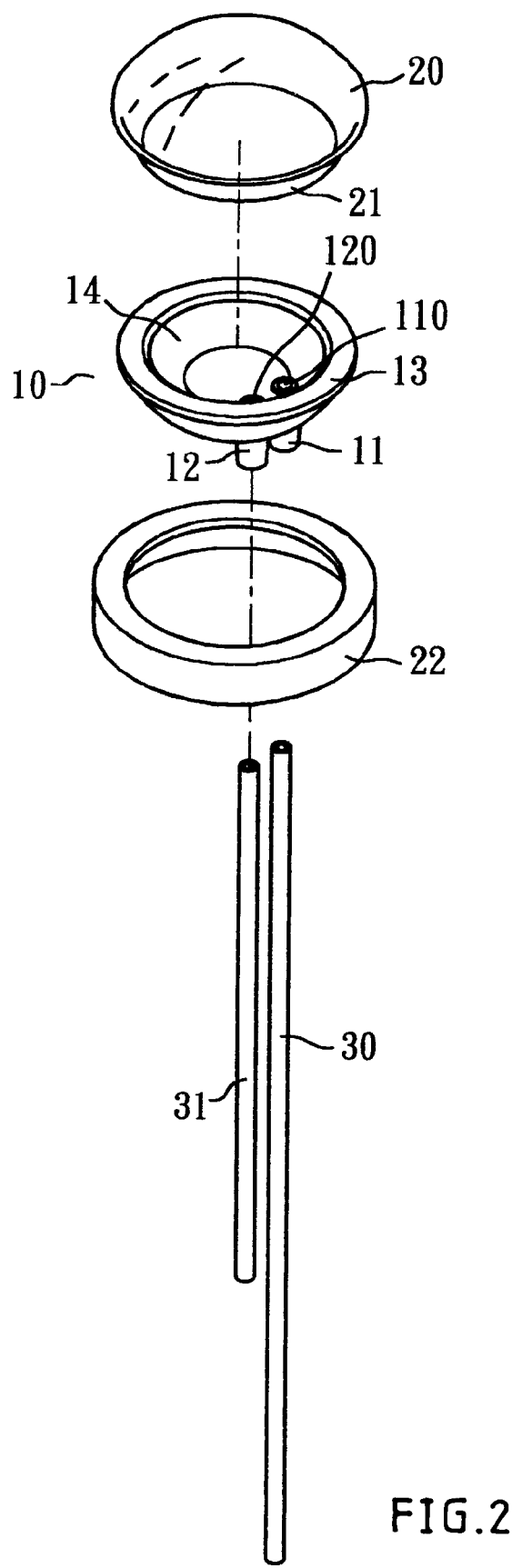
FIG. 2 is an exploded view of an opaque container fluid indicator constructed according to the present invention.

Referring to FIGS. 2 and 3, an opaque container fluid indicator is shown comprised of a bladder holder 10, a soft transparent bladder 20, suction tubes 30 and 31, and a mount 22.

The bladder holder 10 comprises a recessed top open chamber 14, a rim 13 around the recessed top open chamber 14, two through holes 110 and 120 through the bottom wall thereof in communication with the recessed top open chamber 14, and two bottom connecting tubes 11 and 12 respectively downwardly extended from the through holes 110 and 120.

The soft transparent bladder 20 is molded from elastic material, having a binding flange 21 disposed around the bottom opening thereof and fastened to the rim 13 of the bladder holder 10. When installed in the rim 13, the soft transparent bladder 20 is kept in an airtight status.

The suction tubes 30 and 31 are respectively fastened to the bottom connecting tubes 11 and 12 of the bladder holder 10. The suction tubes 30 and 31 can be made having equal lengths. Alternatively, the suction tubes 30 and 31 can be made having different lengths.

The mount 22 is a hollow member adapted for supporting the bladder holder 10 in the spout of an opaque fluid container.

Figure 3A:
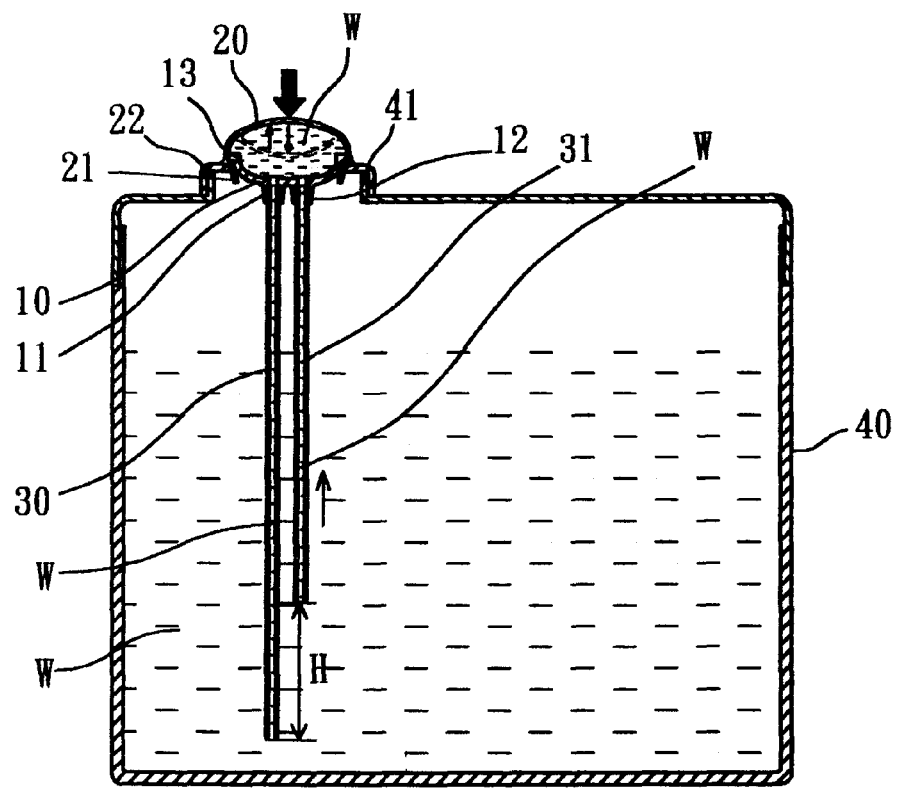
FIG. 3A is a sectional view showing an application example of the present invention.
Figure 3B:
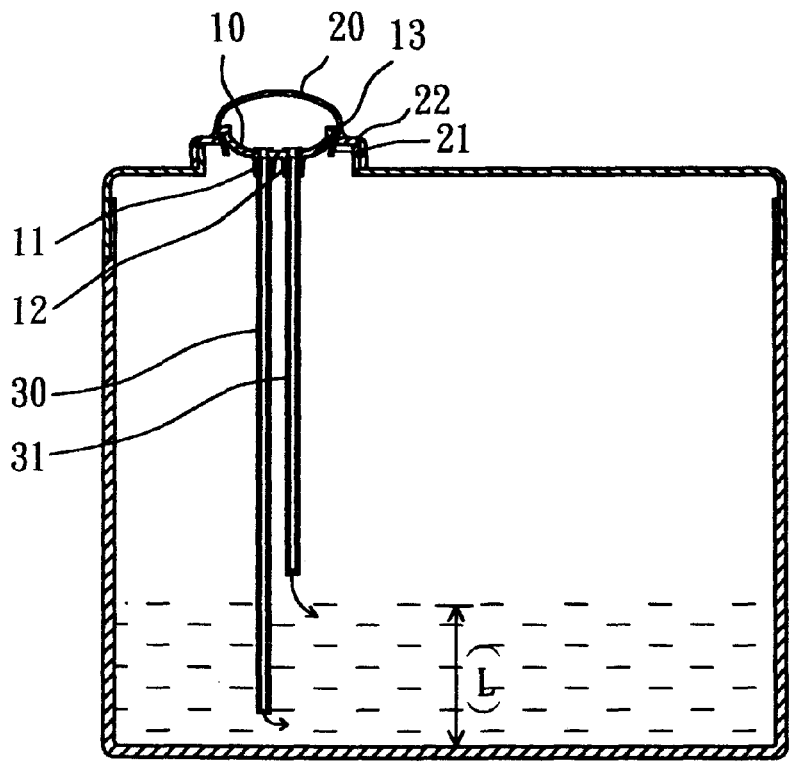
FIG. 3B is similar to FIG. 3A but showing the level of fluid in the opaque fluid container dropped below the critical spare volume.

Referring to FIGS. 3A and 3B, the mount 22 is fixedly fastened to the spout of an opaque fluid container 40 to hold the bladder holder 10 and a bladder 20 in position, keeping the control tubes 30 and 31 suspended inside the opaque fluid container 40. When continuously and alternatively squeeze the bladder 20 and then release it, air is forced out of the bladder 20, and a vacuum is produced in the bladder 20, thereby causing the bladder 20 to suck fluid W from the inside of the opaque fluid container 40. Therefore, the user immediately knows the presence of fluid W in the opaque fluid container 40. At this time, the suction tubes 30 and 31 and the bladder 20 are filled up with fluid W (see FIG. 3A). When fluid is gradually used and dropped to the elevation below the bottom end of the short suction tube 31 but above the bottom end of the long suction tube 30, air pressure passes through the short suction tube 31 into the bladder 20 to force fluid W out of the bladder 20 (see FIG. 3A), and therefore the user knows the time to furnish the opaque fluid container 40 with fluid W again.

In the aforesaid embodiment, the suction tubes 30 and 31 have different lengths, i.e., there is a difference of elevation H between the bottom end of the short suction tube 31 and the bottom end of the long suction tube 30. When the bladder 20 contains no fluid, it means that the fluid level has dropped below the critical spare volume L (see FIG. 3B), and an immediate supply of fluid W is needed.

Figure 4A:
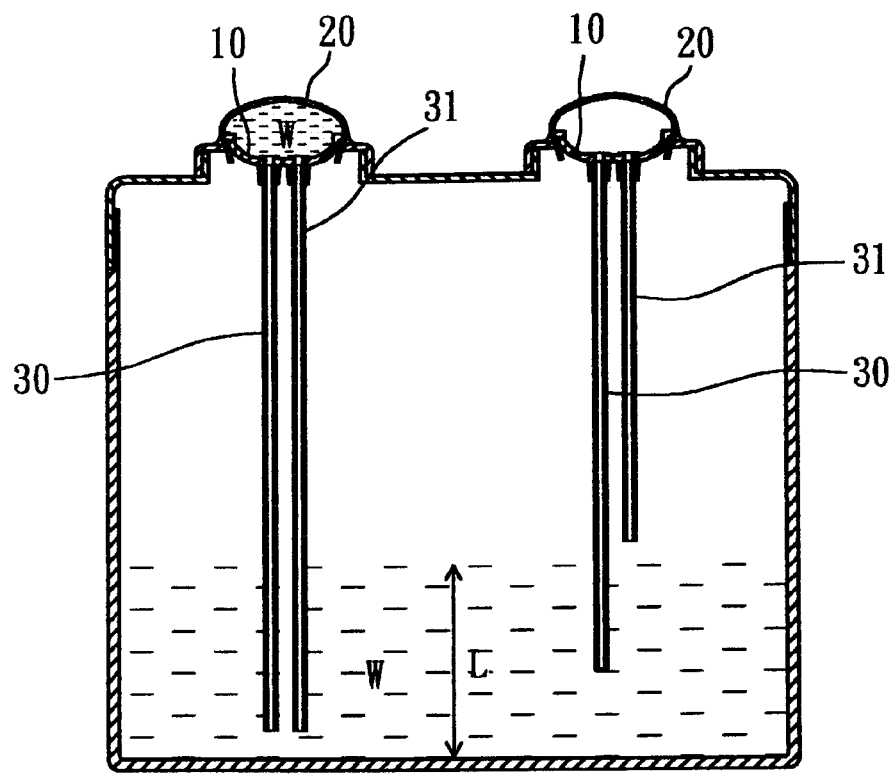
FIG. 4A is a sectional view showing another application example of the present invention.
Figure 4B:
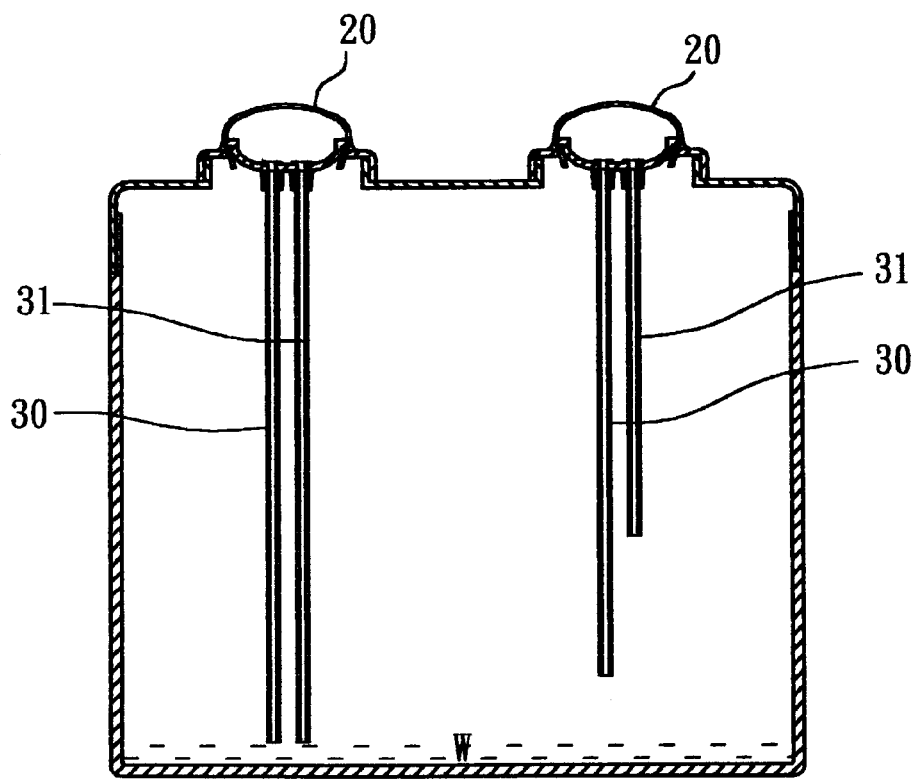
FIG. 4B is similar to FIG. 4A but showing fluid used up.

FIGS. 4A and 4B show an alternate form of the present invention. According to this alternate form, two fluid indicators are provided; one equipped with suction tubes 30 and 31 of equal length, the other with suction tubes 30 and 31 of different length. If the bladder 20 of the fluid indicator having suction tubes 30 and 31 of different length contains no fluid while the bladder 20 of the other fluid indicator showing the presence of fluid W (see FIG. 4A), it means that the fluid level in the opaque fluid container has dropped below the critical spare volume L. In case both bladders 20 contain no fluid, it means that fluid has been completely used up (see FIG. 4B).

Figure 5:
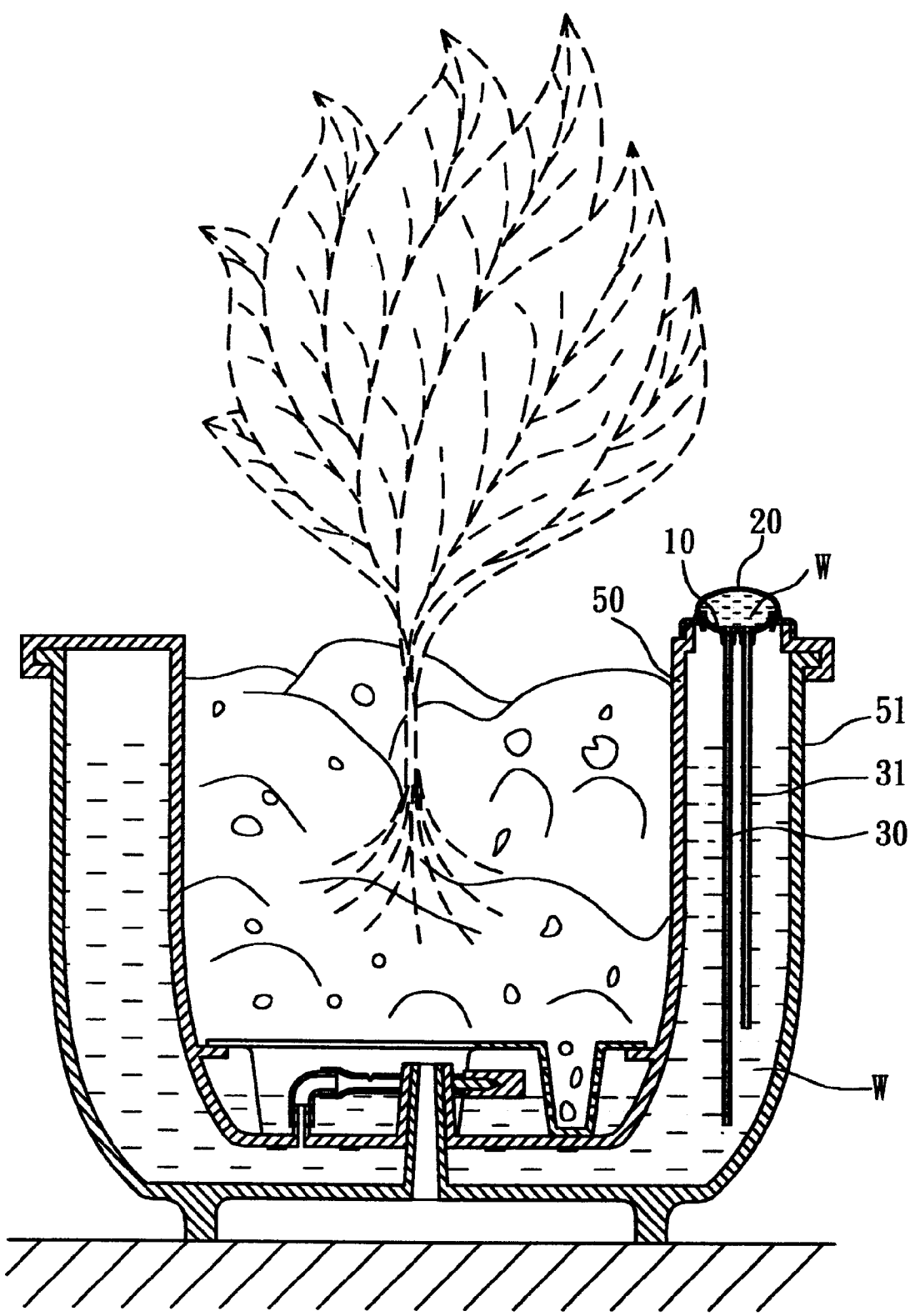
FIG. 5 is a sectional view showing still another application example of the present invention.

FIG. 5 shows the fluid indicator of the present invention installed in the outer water container 51 of a flowerpot 50 to detect the presence of water W.

A prototype of opaque container fluid indicator has been constructed with the features of FIGS. 2~5. The opaque container fluid indicator functions smoothly to provide all of the features discussed earlier.

It is to be understood that the drawings are designed for purposes of illustration only, and are not intended for use as a definition of the limits and scope of the invention disclosed.

What the invention claimed is:

1. An opaque container fluid indicator mounted in the spout of an opaque fluid container and adapted to detect the presence of a fluid in the opaque fluid container comprising:

a bladder holder mounted in the spout of the opaque fluid container, said bladder holder comprising a recessed top open chamber, a rim around said recessed top open chamber, two through holes through a bottom wall thereof in communication with said recessed top open chamber, and two bottom connecting tubes respectively downwardly extended from said through holes;

an elastic transparent bladder fastened to said bladder holder for operation by hand to suck fluid from the inside of said opaque fluid container, said elastic transparent bladder having a binding flange disposed around a bottom opening thereof and fastened to the rim of said bladder holder; and two suction tubes respectively fastened to the bottom connecting tubes of said bladder holder and suspended inside said opaque fluid container.

2. The opaque container fluid indicator as claimed in claim 1 further comprising a mount fixedly fastened to the spout of said opaque fluid container to support said bladder holder in the spout of said opaque fluid container.

3. The opaque container fluid indicator as claimed in claim 1, wherein said suction tubes have an equal length.

4. The opaque container fluid indicator as claimed in claim 1, wherein said suction tubes have different lengths.

* * * * *